(12) United States Patent
Karipides

(10) Patent No.: US 8,159,086 B2
(45) Date of Patent: Apr. 17, 2012

(54) METHODS AND SYSTEMS FOR NO-BREAK POWER TRANSFER CONVERTER

(75) Inventor: David Dimitri Karipides, Casstown, OH (US)

(73) Assignee: GE Aviation Systems LLC, Dayton, OH (US)

(*) Notice: Subject to any disclaimer, the term of this patent is extended or adjusted under 35 U.S.C. 154(b) by 83 days.

(21) Appl. No.: 12/433,744

(22) Filed: Apr. 30, 2009

(65) Prior Publication Data

US 2010/0276996 A1 Nov. 4, 2010

(51) Int. Cl.
*H02J 3/02* (2006.01)

(52) U.S. Cl. ............. 307/22; 307/27; 307/57; 307/68; 307/87; 307/129

(58) Field of Classification Search .......... 307/22, 307/27
See application file for complete search history.

(56) References Cited

U.S. PATENT DOCUMENTS

| | | | |
|---|---|---|---|
| 4,967,096 A | 10/1990 | Diemer et al. | |
| 5,621,254 A | 4/1997 | Takeda et al. | |
| 5,627,744 A | 5/1997 | Baker et al. | |
| 5,642,005 A * | 6/1997 | Pelletier et al. | 307/87 |
| 5,977,645 A | 11/1999 | Glennon | |
| 6,191,500 B1 * | 2/2001 | Toy | 307/64 |
| 6,630,752 B2 | 10/2003 | Fleming et al. | |
| 6,778,414 B2 | 8/2004 | Chang et al. | |
| 6,838,779 B1 | 1/2005 | Kandil et al. | |
| 7,116,003 B2 | 10/2006 | Hoppe | |
| 7,122,916 B2 * | 10/2006 | Nguyen et al. | 307/57 |
| 7,605,497 B2 * | 10/2009 | Gallegos-Lopez et al. | 307/58 |
| 2002/0060499 A1 * | 5/2002 | Wilhelm | 307/72 |
| 2004/0119337 A1 * | 6/2004 | Ketteler | 307/10.1 |
| 2004/0183378 A1 | 9/2004 | Wittner | |
| 2005/0273206 A1 * | 12/2005 | McGinley | 700/291 |
| 2009/0108676 A1 * | 4/2009 | Algrain | 307/73 |
| 2009/0127935 A1 * | 5/2009 | Hung et al. | 307/80 |

OTHER PUBLICATIONS

PCT/US2010/027074, Search Report and Written Opinion, Jun. 17, 2010.

* cited by examiner

*Primary Examiner* — Rexford N Barnie
*Assistant Examiner* — Justen Fauth
(74) *Attorney, Agent, or Firm* — David J. Clement, Esq.; Armstrong Teasdale LLP

(57) ABSTRACT

A method is provided for using a temporary power source to transfer a power bus from a first power source to a second power source. The first power source operates at a first electrical frequency, and the second power source operates at a second electrical frequency that is different from the first electrical frequency. The method includes adjusting the output frequency of the temporary power source to match the first electrical frequency and supplying power to the power bus from the temporary power source. The method also includes disconnecting the first power source from the power bus. The method further includes adjusting the output frequency of the temporary power source to match the second electrical frequency. The method further includes coupling the second power source to the power bus.

20 Claims, 3 Drawing Sheets

METHODS AND SYSTEMS FOR NO-BREAK POWER TRANSFER CONVERTER

BACKGROUND OF THE INVENTION

The field of the invention relates generally to variable frequency (VF) electrical generating systems, and more particularly, to transferring a load between two sources at different frequencies without interrupting power to the load.

At least some known aircraft use VF electrical generating systems as electrical power sources to facilitate improving reliability and minimizing weight. One disadvantage of VF systems is that they cannot easily be placed in parallel with other VF systems or with constant frequency systems to perform a no-break power transfer. Break-type power transfers produce undesirable effects, such as electronic equipment resets and interruptions in power to cabin audio and/or lighting systems, which can distract or annoy passengers. Currently, a no-break transfer between two power sources operating at different frequencies is accomplished by adjusting the output of one source to match the frequency and phase of the other source. However, this configuration requires a relatively complex control system capable of manipulating one or both power sources for the purpose of power transfer and may conflict with other demands on the power source(s).

BRIEF DESCRIPTION OF THE INVENTION

In one aspect, a method is provided for using a temporary power source to transfer a power bus from a first power source operating at a first electrical frequency to a second power source operating at a second electrical frequency different from the first electrical frequency. The method includes adjusting the output frequency of the temporary power source to match the first electrical frequency and supplying power to the power bus from the temporary power source. The method also includes disconnecting the first power source from the power bus. The method further includes adjusting the output frequency of the temporary power source to match the second electrical frequency. The method further includes coupling the second power source to the power bus.

In another aspect, a power transfer device is provided. The power transfer device is operatively couplable to each of a main load bus, a first power source bus, a second power source bus, and a temporary power source. The power transfer device is configured to adjust the output frequency of the temporary power source to match a first electrical frequency of the first power source bus. The power transfer device is further configured to supply power to the main load bus from the temporary power source and disconnect the first power source bus from the main load bus. The power transfer device is also configured to adjust the output frequency of the temporary power source to match a second electrical frequency of the second power source bus, the second electrical frequency being different from the first electrical frequency. The power transfer device is further configured to couple the second power source bus to the main load bus.

In yet another aspect, a system is provided for transferring a power bus from a first source bus to a second power source bus. The first power source bus and the second power source bus are electrically couplable to the power bus through a first switch and a second switch, respectively. The system includes a temporary power source that is electrically coupled to the power bus. The system also includes a controller that is operatively coupled to the first switch, the second switch, and the temporary power source. The controller is configured to sense electrical parameters of the first source bus and the second source bus. The controller is also configured to adjust the output frequency of the temporary power source to match a first electrical frequency detected on the first source bus and to supply power to the power bus from the temporary power source. The controller is further configured to open the first switch to disconnect the first source bus from the power bus. The controller is also configured to adjust the output frequency of the temporary power source to match a second electrical frequency detected on the second source bus, the second electrical frequency differing from the first electrical frequency. The controller is further configured to close the second switch to couple the second source bus to the power bus.

DETAILED DESCRIPTION OF THE INVENTION

The following detailed description illustrates exemplary power transfer devices and methods of using the same by way of example and not by way of limitation. The description clearly enables one of ordinary skill in the art to make and use the invention, and the description describes several embodiments, adaptations, variations, alternatives, and uses of the invention, including what is presently believed to be the best mode of carrying out the invention. The invention is described herein as being applied to a preferred embodiment, namely, a no-break power transfer converter for variable frequency generating systems. However, it is contemplated that this disclosure has general application in a broad range of systems and/or a variety of other commercial, industrial, and/or consumer applications.

A no-break power transfer converter as described herein provides uninterrupted power transfer between power sources operating different frequencies without having to match the output frequencies of the power sources themselves. Further, because power is transferred from one source to another in less than one second, the device requires only a relatively small and lightweight energy storage device (e.g., a capacitor or a battery). The apparatus, including the energy storage device, therefore generates relatively little heat and requires no external cooling system. Such a converter may thus be installed as part of the power system in a new aircraft or may be easily retro-fitted to an existing aircraft.

Figure 1:
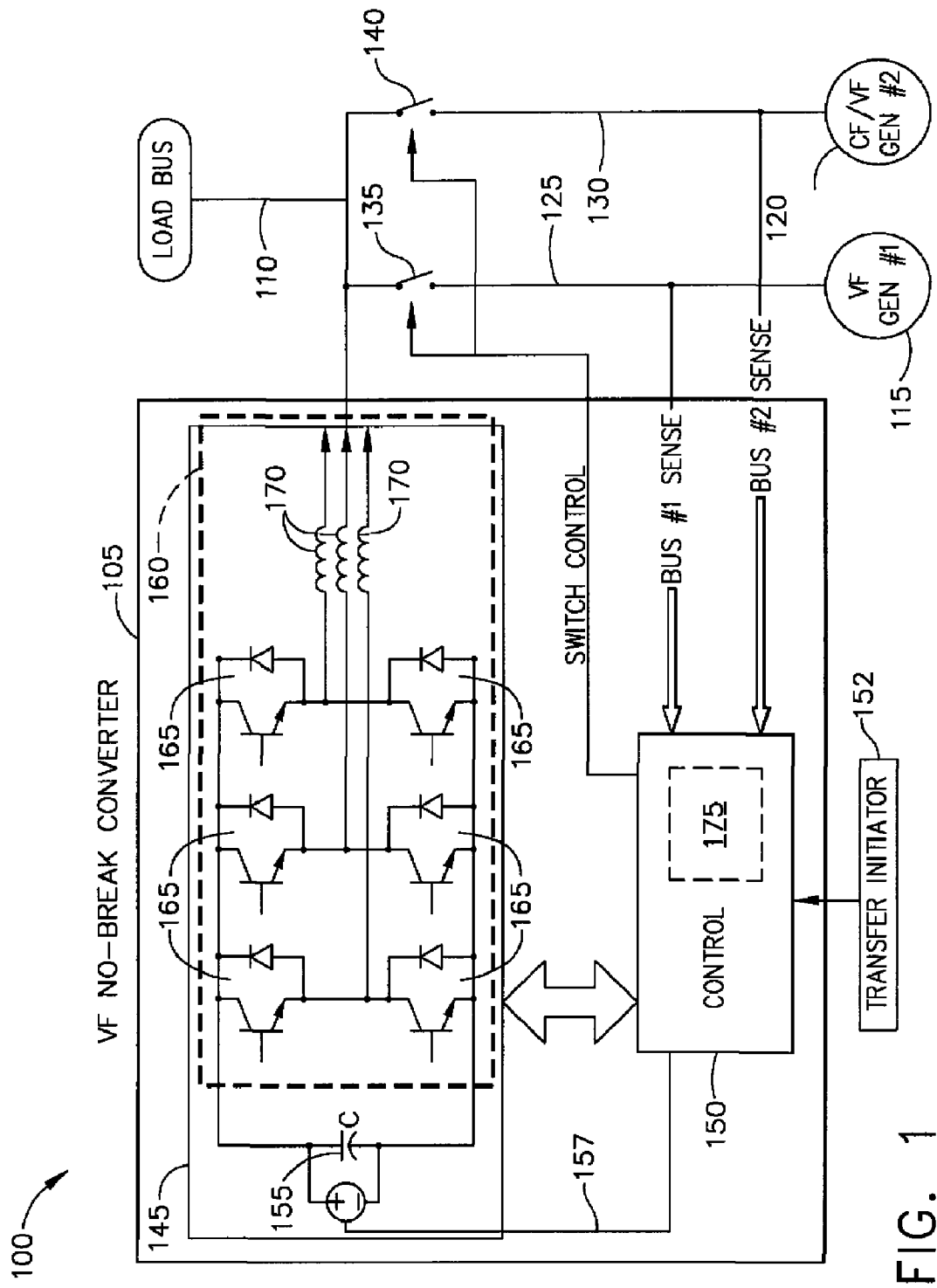
FIG. 1 is a schematic illustration of a power system including a power transfer device.

FIG. 1 is a schematic illustration of an exemplary power system 100 including a power transfer device 105. Power system 100 also includes a main load bus 110. One or more electrical devices (not shown in FIG. 1) are electrically coupled to main load bus 110. In ordinary operation, electrical power is supplied to main load bus 110 from a first power source 115 or a second power source 120. First power source 115 and/or second power source 120 comprises a prime mover and an electrical generator. The electrical generator may operate a variable frequency due to the speed and power output needs of the prime mover.

In the exemplary embodiment, the first power source comprises a jet engine driving an electrical generator on an aircraft. During some phases of operation, such as takeoff, the jet engine operates at a high speed, and the electrical generator therefore operates at a high frequency. In other operating scenarios, such as high altitude cruising, the jet engine operates at a low speed, and the electrical generator operates at a low frequency.

First power source 115 and/or second power source 120 may operate at a variable electrical frequency based on the power output needs of the prime mover such as a jet engine. First power source 115 is electrically coupled to a first source bus 125. Contacts of a first switch 135 are positioned between first source bus 125 and main load bus 110. First source bus 125 can be coupled to or decoupled from main load bus 110 by closing or opening first switch 135. Contacts of a second switch 140 are positioned between second source bus 130 and main load bus 110. Second power source 120 is electrically coupled to a second source bus 130. Second source bus 130 can be coupled to or decoupled from main load bus 110 by closing or opening a second switch 140.

Power transfer device 105 includes a temporary power source 145 that is electrically coupled to main load bus 110. Power transfer device 105 also includes a controller 150. Controller 150 is operatively coupled to first switch 135, second switch 140, and temporary power source 145. Controller 150 is communicatively coupled to a transfer initiator 152. Transfer initiator 152 is configured to command a transfer from first power source 115 to second power source 120 by transmitting a command to controller 150.

Controller 150 is configured to determine electrical parameters such as, but not limited to, an electrical frequency of first source bus 125 and second source bus 130. Controller 150 is also configured to adjust the output frequency of temporary power source 145 using transistors 165 to substantially match the determined electrical frequency of first source bus 125. Controller 150 operates temporary power source 145 such that the output of temporary power source 145 is in phase with first source bus 125 and substantially matches the voltage of first source bus 125 in magnitude. Controller 150 transfers electrical power from main load bus 110 to temporary power source 145. Controller 150 opens first switch 135 to disconnect first source bus 125 from main load bus 110. Controller 150 adjusts the output frequency of temporary power source 145 to substantially match the frequency determined on second source bus 130. In the exemplary embodiment, controller 150 delays adjustment of temporary power source 145 for a duration sufficient for first switch 135 to fully open. Controller 150 closes second switch 140 to couple second source bus 130 to main load bus 110.

In the exemplary embodiment, controller 150 adjusts the output frequency of temporary power source 145 to substantially match the second electrical frequency by adjusting the output frequency of temporary power source 145 from the first electrical frequency to the second electrical frequency. Controller 150 adjusts the output frequency of temporary power source 145 by controlling the firing or conduction time of transistors 165. In the exemplary embodiment, controller 150 adjusts the output frequency from the first electrical frequency to the second electrical frequency in less than about 100 milliseconds, substantially linearly. In an alternative embodiment, controller 150 adjusts the output frequency asymptotically toward the second electrical frequency. In one example, given a first frequency of 600 Hz and a second frequency of 400 Hz, controller 150 adjusts the output of temporary power source 145 by an average of about 5 Hz per millisecond, such that the entire 200 Hz adjustment is performed within about 40 milliseconds.

As illustrated in FIG. 1, power transfer device 105 includes temporary power source 145 as an internal component. In the exemplary embodiment, temporary power source 145 is positioned in a single housing with power transfer device 105. Power transfer device 105 may also or instead be operatively couplable to an external temporary power source (not shown in FIG. 1). Power transfer device 105 may be operatively couplable or coupled to multiple temporary power sources which are internal and/or external to power transfer device 105.

In the exemplary embodiment, temporary power source 145 includes an energy storage device 155. Energy storage device 155 includes, for example, an electrostatic storage device such as a capacitor, an electrochemical storage device such as a battery or a fuel cell, or any other device capable of storing and releasing electrical energy. In the exemplary embodiment, temporary power source 145 includes a converter 160, which converts direct current from energy storage device 155 to alternating current (AC) for main load bus 110. Converter 160 includes transistors 165 and inductors 170. Controller 150 controls the output (e.g., frequency, voltage, and phase) of temporary power source 145 by, for example, controlling the output of transistors 165. Specifically, controller 150 controls the firing or conduction time of transistors 165 to generate an alternating current sine wave at a selectable frequency. Inductors 170 filter the output of transistors 165 to smooth the sine wave output of converter 160. Other converter implementations are also contemplated. Energy storage device 155 is charged by controller 150 via adjustment of the phase of converter 160 relative to the phase of the source bus to which converter 160 is connected. For example, if main load bus 110 is coupled to first source bus 125, to charge energy storage device 155, controller 150 adjusts the phase of converter 160 to trail or lag the phase of first power source 115.

During operation, controller 150 adjusts the output of temporary power source 145 such that a phase difference between temporary power source 145 and second source bus 130 is about zero degrees. Controller 150 may thus obtain a phase lock between temporary power source 145 and second source bus 130 prior to closing second switch 140.

In the exemplary embodiment, controller 150 charges temporary power source 145 from first source bus 125 or second source bus 130 via converter 160 during operation. For example, after power transfer device 105 transfers main load bus 110 from first source bus 125 to second source bus 130, energy storage device 155 is partially or entirely discharged. Energy storage device 155 is charged from second source bus 130 to ensure a similar transfer may be subsequently executed from second source bus 130 to first source bus 125 without interruption of power to main load bus 110.

In an alternative embodiment, controller 150 charges temporary power source 145 from main load bus 110. Main load bus 110 carries alternating current, and energy storage device 155 requires direct current. A rectifier (not shown in FIG. 1) is therefore positioned between main load bus 110 and energy storage device 155 to facilitate charging. The rectifier is included in temporary power source 145 (e.g., in converter 160).

In some embodiments, power transfer device 105 includes a processor 175. In the exemplary embodiment, processor 175 is included in controller 150.

Figure 2:
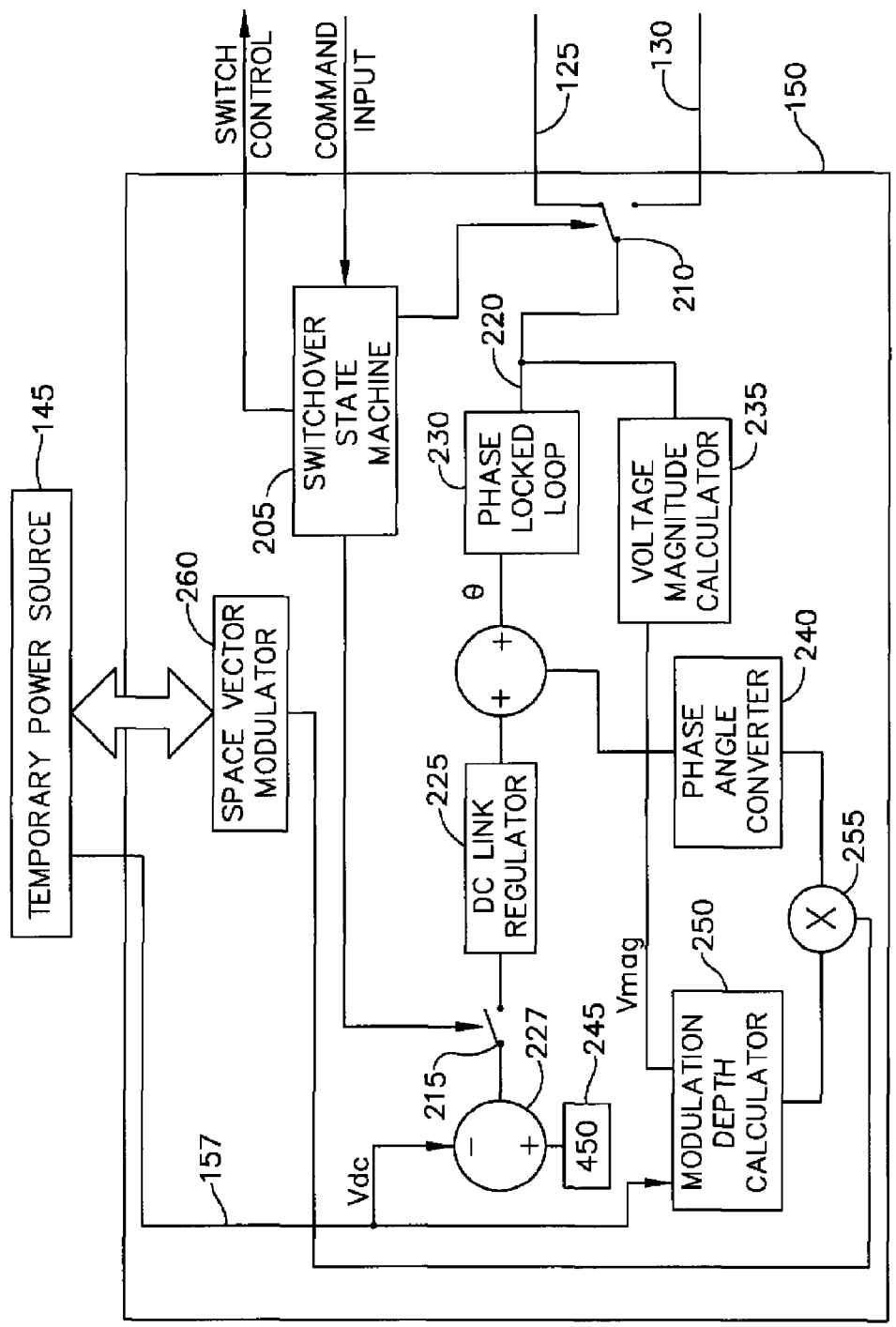
FIG. 2 is a schematic illustration of a power transfer device controller.

FIG. 2 is a schematic illustration of a power transfer device controller such as controller 150. Referring to both FIGS. 1 and 2, controller 150 includes a switchover state machine 205, which provides sequencing and logical control for controller 150. Switchover state machine 205 is communicatively couplable to transfer initiator 152 such that switchover state machine 205 receives a bus transfer command from transfer initiator 152. Switchover state machine 205 is operatively coupled to first switch 135, second switch 140, a third switch 210, and a fourth switch 215. In the exemplary embodiment, third switch 210 is a double throw switch coupling a controller input bus 220 to either first source bus 125 or second source bus 130. Contacts of fourth switch 215 are positioned between a DC link regulator 225 and a summation block 227.

Coupled to controller input bus 220 are a phase locked loop 230 and a voltage magnitude calculator 235. Phase locked loop 230 monitors the phase angle of controller input bus 220. Phase locked loop 230 includes a loop filter (not shown) that adjusts the output phase angle of phase locked loop 230. The loop filter operates according to a time constant that is sufficiently long to ensure phase locked loop 230 adjusts from synchronism with first source bus 125 to synchronism with second source bus 130 over a short time period. This gradual adjustment prevents an abrupt shift of main load bus 110 from first source bus 125 to second source bus 130, which may negatively affect operation of devices attached to main load bus 110.

Voltage magnitude calculator 235 calculates the magnitude of the AC voltage on controller input bus 220, which is fed to phase locked loop 230. This voltage magnitude is used to regulate the output of the converter, as described below. In the exemplary embodiment, the output voltage of the converter substantially equals the voltage supplied to main load bus 110 by a source bus (i.e., first source bus 125 or second source bus 130). Matching voltage in this manner prevents the circulation of reactive power, which may cause unnecessary losses and/or heating in the system.

Output from phase locked loop 230 is added to the output of DC link regulator 225 and supplied to a phase angle converter 240. Phase angle converter 240 converts the rotating angle ($\theta$) from phase locked loop 230 into the $\alpha$, $\beta$ coordinate system. In the exemplary embodiment, the following equations are used: $\alpha=\cos(\theta)$, $\beta=\sin(\theta)$.

DC link regulator 225 develops the proper phase angle shift to be applied to the output of phase locked loop 230, such that power flows from main load bus 110 through converter 160 and charges energy storage device 155 to a target voltage defined by a DC bus voltage setpoint 245. In the exemplary embodiment, DC link regulator 225 is a proportional-integral (PI) type feedback loop controller, and DC bus voltage setpoint 245 is set to 450 volts (V).

Contacts of fourth switch 215 are positioned between DC link regulator 225 and summation block 227, which produces a DC bus voltage error signal by subtracting DC bus voltage setpoint 245 from the inverter's DC link voltage provided by a DC bus sense 157. Switchover state machine 205 is operatively coupled to fourth switch 215 such that switchover state machine 205 controls whether DC link regulator 225 is electrically coupled to summation block 227. DC link regulator receives the DC bus voltage error signal as input only when coupled to summation block 227 by fourth switch 215.

DC bus voltage setpoint 245 is the regulation setpoint for the DC bus voltage of converter 160. For a 115V aircraft bus, for example, a minimum voltage of 281 volts direct current (VDC) is required from the energy storage device 155. The higher the setting of DC bus voltage setpoint 245, the greater percentage of available stored energy is available for extraction from energy storage device 155. The energy stored in energy storage device 155 is proportional to the bus voltage squared. Therefore, the percentage of useful power that can be extracted during a fill-in operation is as follows: $(V_{setpoint}^2 - V_{min}^2)/V_{setpoint}^2$. For example, a setpoint of 450V allows 61% of the total stored energy in energy storage device 155 to be delivered to main load bus 110 during a bus transfer.

Output from voltage magnitude calculator 235, $V_{mag}$, is transmitted to a modulation depth calculator 250. Modulation depth calculator 250 also receives the converter's DC bus voltage ($V_{dc}$) via DC bus sense 157. Modulation depth calculator 250 calculates a desired modulation depth and provides a feed-forward compensation that allows the output voltage of the converter to remain at the desired magnitude as the output voltage of energy storage device 155 declines during a fill-in event. In the exemplary embodiment, the output of modulation depth calculator 250 is $V_{mag}/V_{dc}$.

Output from modulation depth calculator 250 is combined with output from phase angle converter 240 at multiplier 255. Multiplier 255 scales the unity length from phase angle converter 240 ($\alpha$, $\beta$) by the modulation depth from modulation depth calculator 250. The resulting output is a two-dimensional vector $V_{\alpha\beta}$ which represents the desired output voltage from the converter. This signal is transmitted to a space vector modulator 260.

Space vector modulator 260 calculates a switching pattern for transistors 165 such that the average value of the output voltage of temporary power source 145 equals the input signal $V_{\alpha\beta}$. In the exemplary embodiment, space vector modulator 260 achieves the desired output using pulse width modulation.

In an exemplary scenario, main load bus 110 is powered by first source bus 125 when switchover state machine 205 receives a bus transfer command from transfer initiator 152. Switchover state machine 205 coordinates a transfer of main load bus 110 to second source bus 130 by manipulating switches 135, 140, 210, and 215 as illustrated in Table 1 below.

TABLE 1

| Step | First switch 135 | Second switch 140 | Third switch 210 | Fourth switch 215 |
|---|---|---|---|---|
| 1 | Closed | Open | First source bus 125 | Closed |
| 2 | Open | Open | First source bus 125 | Open |
| 3 | Open | Open | Second source bus 130 | Open |
| 4 | Open | Closed | Second source bus 130 | Closed |

In some embodiments, switchover state machine 205 monitors electrical parameters of main load bus 110, first source bus 125, second source bus 130, and/or DC bus sense 157. Based on the monitored parameters, switchover state machine 205 provides protection against fault conditions. Fault conditions include, for example, a requested transfer to an un-energized bus and an out-of-specification bus voltage. Protection against other fault conditions is also contemplated. Depending on the type of fault condition detected, switchover state machine 205 performs a break-type transfer from one source bus to another source bus. For example, a break-type transfer may be appropriate if the bus feeding the converter is out of specification, if the bus to which main load bus 110 is being switched is out of specification, if the load on main load bus 110 exceeds a predetermined maximum load, or if energy storage device 155 is insufficiently charged at the time the transfer is requested.

In some embodiments, switchover state machine 205 is capable of performing a test of itself, controller 150, power transfer device 105, and/or power system 100. A test may be initiated automatically by switchover state machine 205 (e.g., periodically or when switchover state machine 205 is powered on) or may be manually initiated by a human operator (e.g., by engaging a momentary switch). If switchover state machine 205 detects malfunctioning components or connections during a test, switchover state machine 205 triggers an alarm such as a visible indicator, an audible alarm, and/or a signal to a monitoring system. In some embodiments, switchover state machine 205 includes processor 175 for performing the operations described herein.

Figure 3:
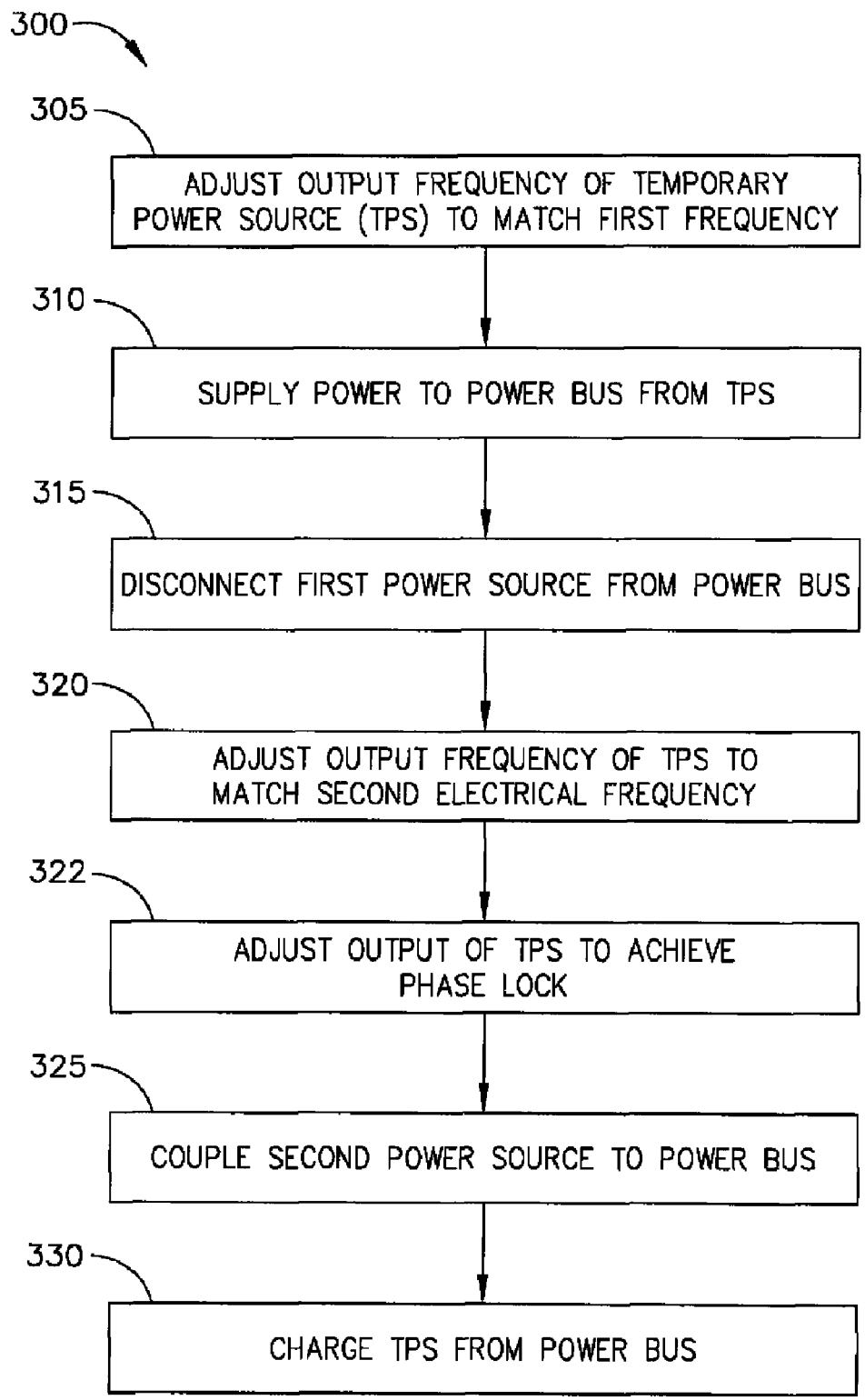
FIG. 3 is an exemplary flowchart of a method for transferring a power bus from a first power source to a second power source using a temporary power source such as that shown in FIG. 1.

FIG. 3 is a flowchart of a method 300 for transferring a power bus from a first power source to a second power source using a temporary power source. In the exemplary embodiment, method 300 is illustrated with the first power source operating at a first electrical frequency and the second power source operating at a second electrical frequency that is different from the first electrical frequency.

Method 300 includes adjusting 305 the output frequency of the temporary power source to substantially match the first electrical frequency and supplying 310 power to the power bus from the temporary power source. In some embodiments, the output frequency of the temporary power source is adjusted to equal the first electrical frequency, and the output of the temporary power source is also adjusted to achieve a phase lock with the first power source.

Method 300 also includes disconnecting 315 the first power source from the power bus. Method 300 further includes adjusting 320 the output frequency of the temporary power source to substantially match the second electrical frequency. In the exemplary embodiment, adjusting 320 the output frequency of the temporary power source to match the second electrical frequency includes adjusting the output frequency of the temporary power source from the first electrical frequency to the second electrical frequency in less than about 100 milliseconds. In the exemplary embodiment, prior to coupling 325 the second power source to the power bus, method 300 includes adjusting 322 the output of the temporary power source such that a phase difference between the temporary power source and the second power source is about zero degrees (i.e., phase lock is achieved).

Method 300 further includes coupling 325 the second power source to the power bus. In the exemplary embodiment, method 300 also includes charging 330 the temporary power source from the power bus when the temporary power source is not being used to transfer the load bus between power buses.

Method 300 achieves a smooth transition from the first power source to the second power source with no interruption in power to the power bus and without having to adjust the prime mover of one of the power sources to bring the frequencies of the buses to be approximately equal before transferring the load. Method 300 also facilitates reducing a surge or a transient event on the power bus while transferring from the first power source to the second power source.

In one embodiment, the temporary power source includes an energy storage device such as a capacitor, a battery, and/or a fuel cell. Supplying 310 power to the power bus from the temporary power source includes discharging the energy storage device while supplying power to the power bus. In some embodiments, the temporary power source also includes a converter for converting direct current supplied from the energy storage device to alternating current.

The power source may be coupled to the power bus by closing a switch and decoupled from the power bus by opening the switch. Other methods of coupling and decoupling power sources to and from the power bus are also contemplated.

While the embodiments described above involve a transfer of an electrical load between two power sources, similar methods, devices, and systems may be implemented with any number of power sources. For example, an aircraft power bus may include a main generator and an auxiliary power unit (APU) and may also be electrically couplable to a terrestrial power source (i.e., "ground power"). In this example, a power transfer device may be coupled to each of the three power sources and may execute a no-break transfer between any two power sources.

In some embodiments, a power transfer device performs a no-break (i.e., uninterrupted) failover function. The power transfer device continuously or periodically detects a first electrical frequency of a first power source. The power transfer device detects a malfunction in the first power source and supplies power to the power bus from the temporary power source at the first electrical frequency. The power transfer device disconnects the first power source from the power bus. The power transfer device detects a second electrical frequency of a second power source (e.g., an APU), adjusts the output frequency of the temporary power source to match the second electrical frequency, and couples the second power source to the power bus.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 175, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is transferring a load bus from a power source operating at one frequency to another power source operating at a different frequency. Performing such a transfer with a gradual adjustment between the two frequencies prevents interruptions or resets in devices attached to the load bus. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Exemplary embodiments of no-break power transfer converters and methods of uninterrupted power transfer are described above in detail. The methods and systems are not limited to the specific embodiments described herein, but rather, components of the methods and systems may be utilized independently and separately from other components described herein. For example, the methods and systems described herein may have other industrial and/or consumer applications and are not limited to practice with only variable frequency generators in aircraft. Rather, the present invention can be implemented and utilized in connection with many other industries.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of transferring an electrical supply of a power bus from a first electrical generator operating at a first electrical frequency to a second electrical generator operating at a second electrical frequency different from the first electrical frequency, the method comprising:
   adjusting the output frequency of a temporary power source to substantially match the first electrical frequency;
   supplying power to the power bus from the temporary power source at the first electrical frequency;
   disconnecting the first electrical generator from the power bus;
   adjusting the output frequency of the temporary power source to substantially match the second electrical frequency; and
   coupling the second electrical generator to the power bus.

2. A method according to claim 1, further comprising charging the temporary power source from the power bus.

3. A method according to claim 1, further comprising adjusting the output of the temporary power source such that a phase difference between the temporary power source and the second electrical generator is about zero degrees.

4. A method according to claim 1, wherein adjusting the output frequency of the temporary power source to match the second electrical frequency comprises adjusting the output frequency of the temporary power source from the first electrical frequency to the second electrical frequency in less than about 100 milliseconds.

5. A method according to claim 1, wherein the temporary power source comprises a capacitor, and wherein supplying power to the power bus from the temporary power source comprises discharging the capacitor while supplying power to the power bus.

6. A method according to claim 1, wherein the temporary power source includes a converter and wherein supplying power to the power bus from the temporary power source at the first electrical frequency comprises converting direct current supplied from at least one of a capacitor and a battery to alternating current.

7. A power transfer device operatively couplable to each of a main load bus, a first power source bus coupled to a first electrical generator operating at a first electrical frequency, a second power source bus coupled to a second electrical generator operating at a second electrical frequency, and a temporary power source, the power transfer device configured to:
   adjust the output frequency of the temporary power source to match the first electrical frequency;
   supply power to the main load bus from the temporary power source;
   disconnect the first power source bus from the main load bus;
   adjust the output frequency of the temporary power source to match the second electrical frequency, the second electrical frequency being different from the first electrical frequency; and
   couple the second power source bus to the main load bus.

8. A power transfer device according to claim 7, wherein the temporary power source is positioned in a single housing with the power transfer device.

9. A power transfer device according to claim 8, wherein the temporary power source comprises an energy storage device.

10. A power transfer device according to claim 9, wherein the temporary power source further comprises a converter configured to convert direct current from the energy storage device to alternating current.

11. A power transfer device according to claim 10, further configured to adjust the output of the converter such that a phase difference between the temporary power source and the second power source bus is about zero degrees.

12. A power transfer device according to claim 7, further configured to charge the energy storage device from the main load bus.

13. A power transfer device according to claim 7, wherein:
   the first power source bus is electrically couplable to the main load bus through a first switch;
   the second power source bus is electrically couplable to the main load bus through a second switch;
   the power transfer device is configured to disconnect the first power source bus from the main load bus by opening the first switch; and
   the power transfer device is configured to couple the second power source bus to the main load bus by closing the second switch.

14. A system for transferring a load bus from a first source bus to a second source bus, the first source bus electrically coupled to a first electrical generator and electrically couplable to a power bus through a first switch, the second source bus electrically coupled to a second electrical generator and electrically couplable to the power bus through a second switch, the system comprising:
   a temporary power source electrically coupled to the load bus; and
   a controller operatively coupled to the first switch, the second switch, and the temporary power source,
   wherein the controller is configured to:
      determine electrical parameters of the first source bus and the second source bus;
      adjust the output frequency of the temporary power source to substantially match a first electrical frequency determined on the first source bus, wherein the first electrical frequency is a frequency at which a first electrical generator coupled to the first source bus operates;
      supply power to the power bus from the temporary power source;
      open the first switch to disconnect the first source bus from the power bus;
      adjust the output frequency of the temporary power source to substantially match a second electrical frequency detected on the second source bus, the second electrical frequency differing from the first electrical frequency, wherein the second electrical frequency is a frequency at which a second electrical generator coupled to the second source bus operates; and
      close the second switch to couple the second source bus to the power bus.

15. A system according to claim 14, wherein the temporary power source comprises an energy storage device comprising at least one of a capacitor and a battery.

16. A system according to claim 15, wherein the controller is further configured to charge the energy storage device from at least one of the power bus, the first source bus, and the second source bus.

17. A system according to claim 14, wherein the controller is further configured to adjust the output of the temporary power source such that a phase difference between the temporary power source and the second power bus is about zero degrees.

18. A system according to claim 14, wherein the controller is configured to adjust the output frequency of the temporary power source to substantially match the second electrical frequency by adjusting the output frequency of the temporary power source from the first electrical frequency to the second electrical frequency.

19. A system according to claim 17, wherein the controller is configured to adjust the output frequency of the temporary power source from the first electrical frequency to the second electrical frequency in less than about 100 milliseconds.

20. A system according to claim 14, wherein at least one of the first source bus and the second source bus is coupled to an electrical generator operating at a variable electrical frequency.

* * * * *